Nov. 11, 1952 V. P. LONG ET AL 2,617,267
CIRCULAR FROZEN FOOD LOCKER
Filed Dec. 6, 1950 3 Sheets-Sheet 1
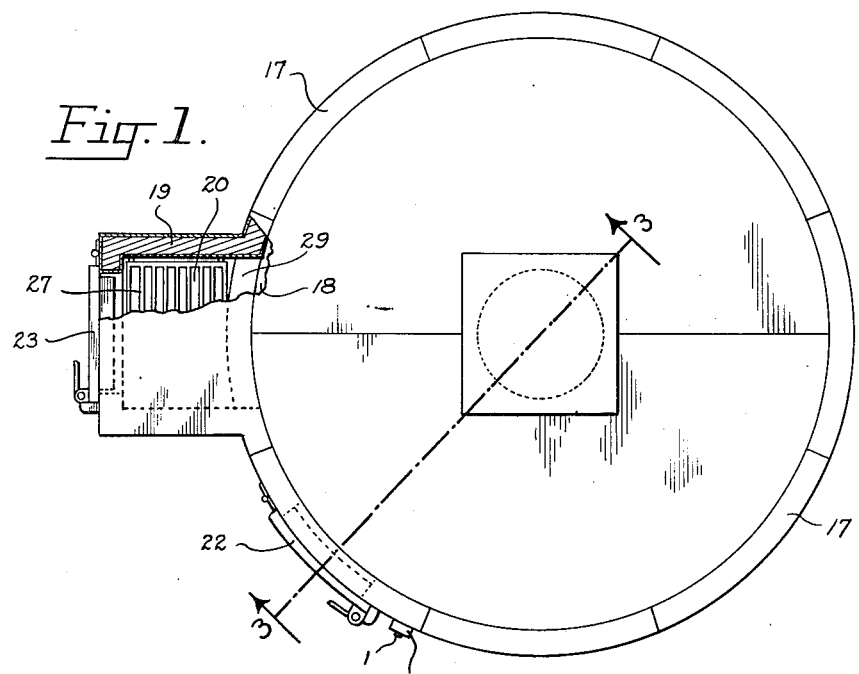
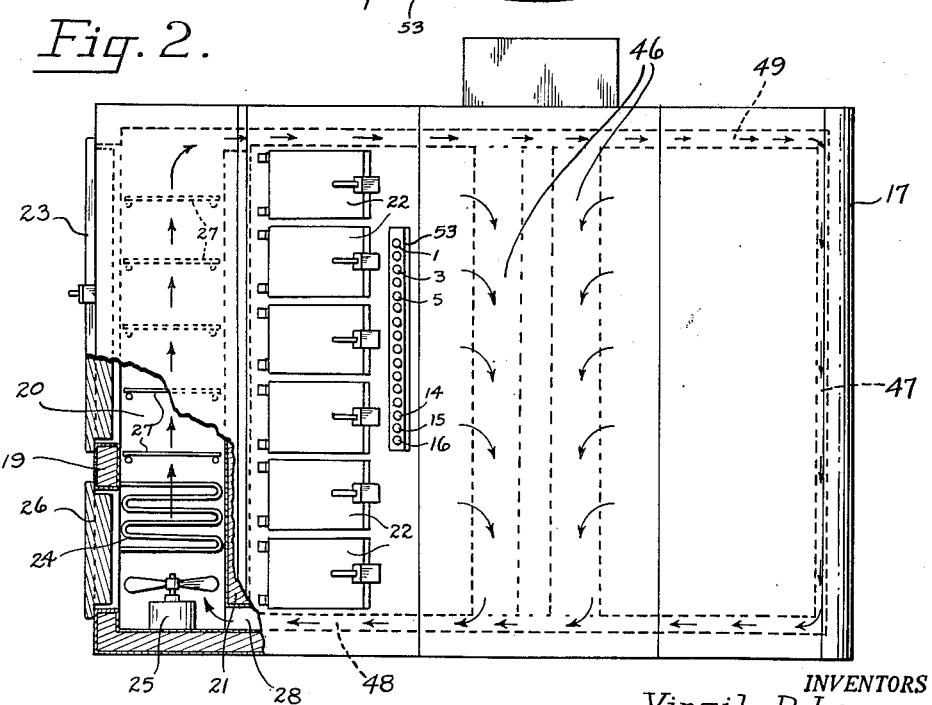
INVENTORS
Virgil P. Long and
Verlin M. Wolfe Nov. 11, 1952 V. P. LONG ET AL 2,617,267
CIRCULAR FROZEN FOOD LOCKER
Filed Dec. 6, 1950 3 Sheets-Sheet 2

INVENTORS
Virgil P. Long and
BY Verlin M. Wolfe
Atty.

Nov. 11, 1952 V. P. LONG ET AL 2,617,267
CIRCULAR FROZEN FOOD LOCKER
Filed Dec. 6, 1950 3 Sheets-Sheet 3
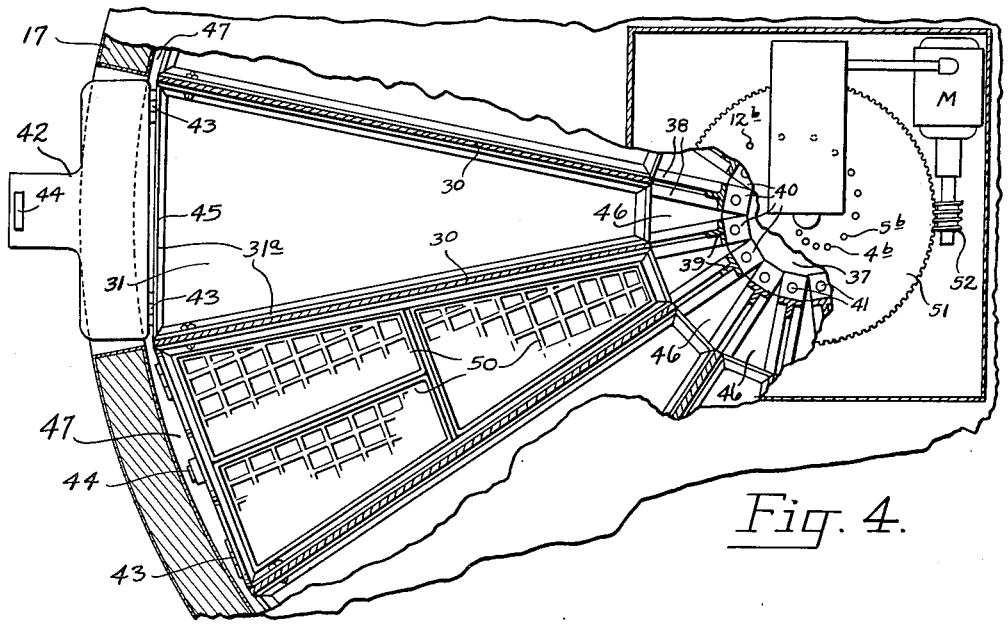
Fig. 4.
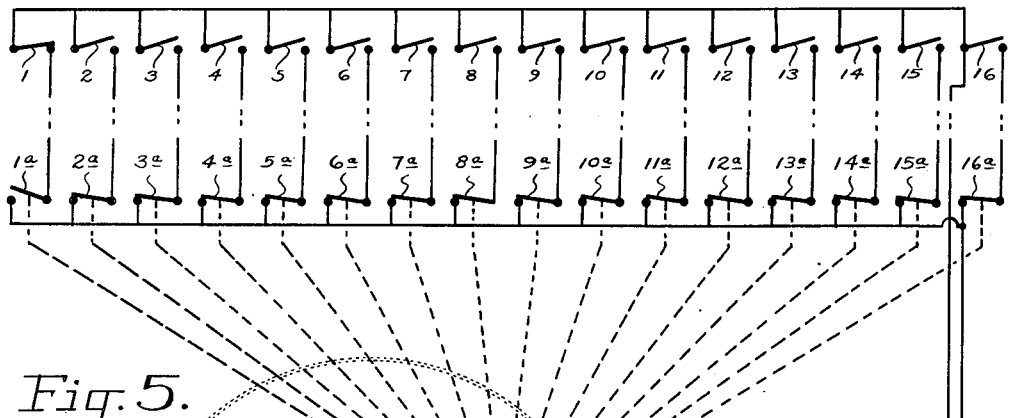
Fig. 5.
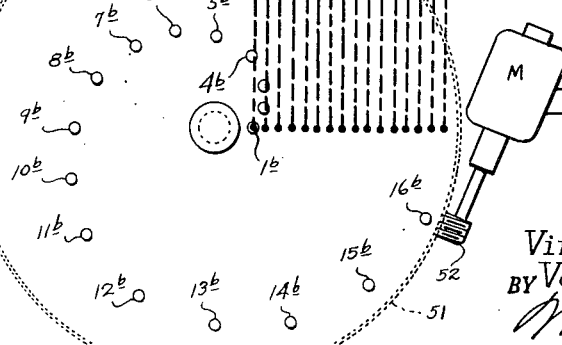
INVENTORS
Virgil P. Long and
BY Verlin M. Wolfe
Atty.

Patented Nov. 11, 1952

2,617,267

UNITED STATES PATENT OFFICE 2,617,267

CIRCULAR FROZEN FOOD LOCKER

Virgil P. Long, Canyonville, and Verlin M. Wolfe, Corvallis, Oreg.

Application December 6, 1950, Serial No. 199,499

7 Claims. (Cl. 62—102)

Our invention relates to a rotary, frozen food locker adapted to serve, commercially, a large number of patrons. It is adapted to be entered directly from a warm room as from the sales room of a grocery store or butcher shop. That is, our locker differs from the conventional commercial cold storage locker in that each individual locker space is a wedge-shape sector of a rotatably mounted cylinder and each is accessible from a warm room rather than from a cold storage room.

One object of our invention is to provide a contiguous locker storage room and sharp freeze room which are separated by an insulated wall, but which are in communication through an air duct whereby a single refrigeration apparatus, located in the sharp freeze room will refrigerate both rooms by convection and will maintain the optimum temperature differential therebetween.

Another object of our invention is to provide a prefabricated frozen food locker which is cylindrical in shape to accommodate a rotatably mounted locker assembly. This allows our entire unit to be assembled in a grocery store or elsewhere at a minimum cost and in a minimum time, and the resultant structure will occupy a minimum space. These factors adapt our frozen food locker to the needs of country stores, apartment houses, small groceries, and small communities or housing projects wherein the conventional commercial cold storage locker has proven prohibitive in cost and overall space requirements.

Rotary frozen lockers and, more particularly, warm room lockers of the rotary type are becoming increasingly popular for use in small groceries and in apartment houses. This is understandable since these lockers involve a minimum cost and occupy a minimum space. By way of example, the conventional rotary locker may be located in any warm room and may include a large, polygonal or cylindrical insulating wall bounding a frozen food storage room. Within this room, a turntable with a large number of individual lockers is rotatably mounted and some rotation producing mechanism is correlated thereto. The individual locker storage spaces are wedge-shaped and are stacked on the turntable in a number of horizontal tiers to provide a corresponding group of vertical rows. A single vertical row of doors is carried by the insulating wall and one door serves each tier of lockers. Thus, access may be had to each individual locker space by rotating the turntable and opening the appropriate door.

We have long been interested in the construction and sale of warm room lockers. This interest and the experimentation arising therefrom have led us to a recognition of certain disadvantages which we find to be inherent in the aforementioned conventional rotary lockers. Accordingly, we have turned our inventive efforts toward an elimination of these disadvantages and toward the provision of an improved rotary frozen food locker. To this end, the twin advantages of low erection cost and minimum space requirements must be considered with regard to a comparison between a rotary locker and a fixed type commercial cold storage locker, the latter type being the massive forefather of the former.

Conventionally, a fixed cold storage locker occupies a separate building, and the maintenance thereof is a business enterprise in and of itself. Most urban homemakers are familiar with these structures. They are, in effect, a huge insulated building complete with refrigeration mechanism, a sharp freeze room, a storage room, and office space. The patrons of such an enterprise rent individual locker spaces in the storage room wherein meat, fish, vegetables, etc., are maintained in the frozen state at temperatures between 0 and 10 degrees Fahrenheit. The sharp freeze room, on the other hand, is maintained at a somewhat lower temperature and is utilized in common by all patrons to sharp freeze their provisions before storage.

In comparison to this business enterprise, the conventional warm room locker appears quite small and it is seldom managed as a separate business. Thus, the smaller type locker provides from 10 to 100 individual storage spaces whereas the larger type may provide from 100 to 5,000 or more individual spaces. Similarly, the smaller type is more usually found in a grocery store, apartment building, or housing project where its presence is secondary to the overall purpose of the locale. Accordingly, the previously mentioned twin requisites of cost and space come to the fore and such "luxuries" as a separate sharp freeze room, differential sharp freeze and storage temperatures, and an insulated building, conventionally, are eliminated. We have found, however, that the elimination of these so-called "luxuries" is a disadvantage heretofore inherent in the rotary-type locker. For example, it is well-known that vegetables and meat should be frozen in the shortest time possible. Such a quick or sharp freeze tends to retain the succulent, fresh flavor of vegetables, yet the normal storage room temperature is too high to perform this function efficiently. Accordingly, one object of our invention is to provide a small rotary-type locker with a sharp freeze room. Such provision, however, would appear to conflict with the prime requisite of low construction and operation cost. This conflict has been resolved, in a novel manner, with our inventive structure.

To this end, our locker includes a cylindrical insulating wall to which a small radial extension is added. The extension houses our sharp freeze room and the main wall houses our cylindrical storage room. These rooms are placed in communication via a plurality of cold air ducts and the sharp freeze room is provided with a refrigerated surface (such as coils) and with a blower. The storage room, on the other hand, is provided with an upper and a lower horizontal circulation space and with a plurality of peripheral and central vertical circulation passages. The blower functions to circulate air over the refrigerated surface so as to chill the same to a sharp freeze temperature such as will assure the retention of the succulent flavor of frozen vegetables. This chilled air is then passed through the sharp freeze room and through the ducts into the storage room, sequentially. Such passage causes the air to pick up some heat before it is circulated throughout the storage room. Thus, by careful correlation of the various ducts, passages, and circulation spaces, we are able to maintain an optimum temperature differential between our sharp freeze and storage rooms. Furthermore, this correlation allows us to refrigerate both rooms with but one refrigeration apparatus. The saving in cost is obvious.

Accordingly, another object of our invention is to provide a rotary-type locker with a common insulating wall bounding a sharp freeze and a storage room which are in communication via a plurality of cold air ducts. In addition, we provide a unitary means within the sharp freeze room for refrigerating the sharp freeze room and the storage room by convection, sequentially.

A further object of our invention is to provide a novel circulation space and vertical passage arrangement within the storage room of a rotary-type food locker whereby refrigeration by convection is promoted, yet the overall space requirements of the locker are held to a minimum.

These and other objects and advantages of our invention will be set forth in the following detailed description taken in conjunction with the accompanying drawings, wherein:

Fig. 1 is a plan view, partially broken away, showing our contiguous sharp freeze and storage rooms and indicating the cylindrical shape of the latter;

Fig. 2 is a side view, also partially broken away, showing the refrigeration mechanism in our sharp freeze room and showing the push button control panel and the single vertical row of doors which provide access to the individual locker spaces;

Fig. 4 is an enlarged plan detail view, partially broken away on a line below the top tier of lockers, showing the individual wedge-shaped locker spaces and the novel peripheral and central vertical passages; and Fig. 5 is a schematic working diagram indicating the electric circuit and switches by means of which the locker rotation is controlled.

Figure 3:
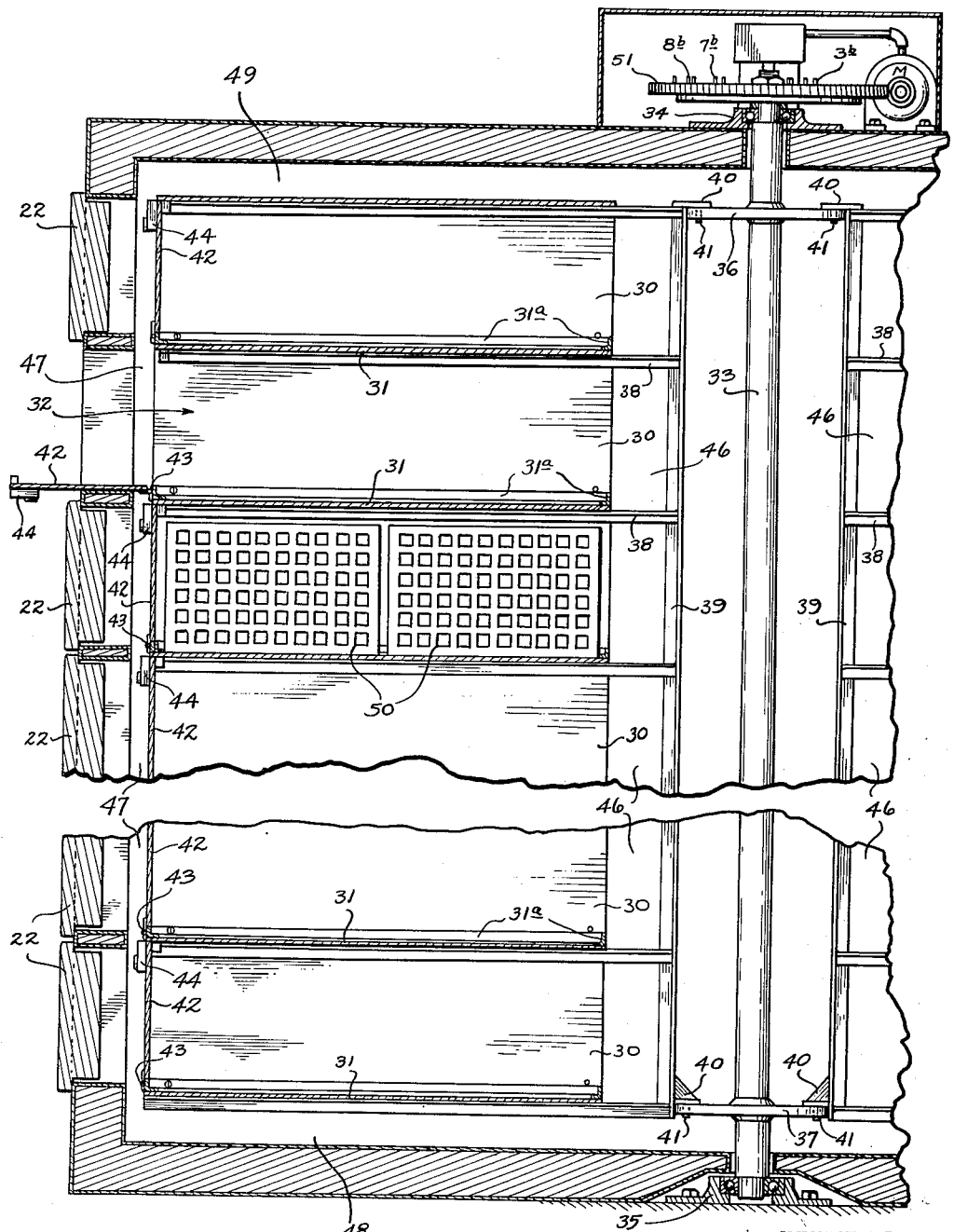
Fig. 3 is a foreshortened section view, taken substantially on the line 3—3 of Fig. 1, showing the interior of our storage room and the manner in which the interconnected lockers are mounted for rotation about a vertical axis.

In the preferred embodiment of our invention, a closed cylindrical insulating wall 17 bounds the periphery of a cylindrical storage room 18 to separate the same from the atmosphere of a warm room. Similarly, a radial extension 19 bounds a sharp freeze room 20. As best shown in Fig. 2, one section of the insulating wall 21 is common to these two rooms and serves to separate the same. As previously mentioned, I prefer to prefabricate the various sections of my rotary locker for assembly "on the job." To this end, Fig. 1 indicates the manner in which the cylindrical insulating wall 17 is assembled from a number of individual arcs.

One vertical section of the cylindrical insulating wall 17 is provided with a plurality of doors 22. These doors 22 allow access to the cylindrical storage room from a warm room and, similarly, a large door 23 allows access to the sharp freeze room 29 from a warm room. Within the sharp freeze room 20 and adjacent the bottom thereof, we provide a refrigerated surface such as the coil 24. This coil 24 may be cooled in any conventional manner, as for example by a compressor and expansion valve located in a separate space exterior to our locker structure. Suffice to say, any refrigeration mechanism will serve the purpose so long as it is capable of reducing the temperature of the refrigerated surface to 25 or more degrees below zero.

Directly adjacent and preferably below the coil 24, we secure a blower 25. Access may be had to the blower 25 and the coil 24 by means of a removable door 26. The remainder of the sharp freeze room 20 is occupied by a plurality of apertured shelves 27, access to which may be had through the aforementioned large door 23. The shelves 27 are apertured to allow the blower 25 to circulate cold air up through the sharp freeze room 20 as indicated by the arrows in Fig. 2. To a similar end, the section of insulating wall 21 is pierced by a lower and an upper circulation duct 28 and 29, respectively. Thus, the blower 25 draws air through the lower duct 28, circulates the air over the refrigerated surface 24, drives the air up about the shelves 27 and through the sharp freeze room 20, and out through the upper duct 29. While we have shown this "reverse flow" type of circulation, it is obvious that the blower 25 and surface 24 could be located at the top of the sharp freeze room 20 and the air could be blown down. Accordingly, the scope of our inventive concept is commensurate with either type convection refrigeration.

Turning now to Figs. 3 and 4, we have therein shown the manner in which a plurality of solid radial walls 30 and horizontal spacers 31 are interconnected to define a turntable which is subdivided into a plurality of wedge-shaped locker spaces 32. This turntable is mounted for rotation about a vertical axis within the storage room 18. To this end, a vertical pipe 33 is journaled in an upper and a lower radial thrust bearing 34 and 35, respectively. A circular carry plate 36 is secured to the upper portion of the pipe 33 and a similar plate 37 is secured to the lower portion thereof. In Fig. 4, the portion broken away has been taken on a section line somewhat below the upper plate 36 so that this particular plate does not show. Such a section better illustrates the joinder of the radial walls and spacers to the other frame members.

That structure utilized to secure each of the solid radial walls 30 and horizontal spacers 31 to the two circular plates 36 and 37, will now be described. Thus, a plurality of horizontal angle irons 38 are secured to each side of each radial wall 30 and are spaced apart the height of each individual locker space 32. These angle irons, in turn, are secured at one end to a vertical T-section 39 and each T-section carries an upper and a lower flange 40. Each of the circular plates 36 and 37 are pierced by a plurality of apertures to accommodate the male members 41 carried by the flanges 40. Thus, an integral interconnected structure is cantilevered radially outward from the vertical axis of rotation defined by the pipe 33.

With reference to the structural details of each wedge-shaped locker space 32, it will be seen that we have provided a T-shaped door 42 adapted to partially close the outer or peripheral end thereof. This door 42 is hinged as at 43 to the straight angle iron 45 which bounds the outer periphery of each locker space and which is joined to the aforementioned angle irons 38. Furthermore, each door 42 carries a latch 44 to secure the door in a closed position. In further detail, Fig. 3 indicates the manner in which each horizontal spacer 31 is provided with raised margins 31a to define a cupped bottom for each locker space 32 (these raised margins may be provided by angle irons if desired). Thus, should a liquid vegetable juice or other substance inadvertently spill in the bottom of one of the locker spaces 32, the cupped bottom will catch the liquid and retain it rather than allowing it to run down into the locker located next below.

Referring again to Fig. 2, we have therein shown, by arrows, the manner in which our cylindrical storage room 18 is best refrigerated by convection. To this end, each of the horizontal spacers 31 terminates short of the vertical axis of rotation to provide a series of wedge-shaped openings (see Fig. 4) defining a plurality of vertical passages 46. Similarly, each locker space 32 carries the aforementioned straight angle iron 45 to give the turntable a polygonal peripheral outline (again, see Fig. 4). This polygonal outline, together with the cylindrical wall 17, defines a plurality of segmental vertical passages 47 which we deem to be of special importance. Still further, each of the circular plates 36 and 37 is spaced from the insulating wall companion thereto to define a top and a bottom circulation space 49 and 48, respectively. These various circulation spaces, passages, and ducts account for the arrows shown in Fig. 2. In further explanation, it will be noted that each locker space 32 is substantially open at both radial ends to promote radial convection. Thus, we have carefully correlated the ducts, passages, and circulation spaces and the configuration of each locker to promote refrigeration by convection of both the sharp freeze room and the storage room.

In further promotion of the convection refrigeration of our lockers, we prefer to provide each locker space 32 with three wedge-shaped apertured baskets 50. These baskets extend substantially the full height of each locker space in order to utilize all unobstructed space. Removal of the baskets is enhanced by virtue of the provision of three separate baskets with open tops and by virtue of the manner in which the T-shaped door 42 swings open. Thus, as shown in Figs. 3 and 4, each locker door 42 swings open to provide a shelf over which one or more of the baskets 50 may be slid for ready access. Still further, it will be noted that the cross bar on each T-shaped door substantially closes the segmental vertical passage 47 associated therewith when the door is open. Such closure helps prevent the loss of cold air from the storage room when one of the doors 22 is opened. This same function is enhanced by the provision of a separate door 22 for each horizontal tier of lockers. That is to say, one of the prime requisites of a rotary-type warm air locker is a low cost of operation. This requires that the smallest and least expensive refrigeration mechanism be employed. If such a mechanism is to function efficiently, heat loss from the locker storage room must be kept to a minimum. We have served this purpose by means of the structures mentioned above.

Turning now to the schematic working diagram of Fig. 5, we have shown the mechanism for rotating our turntable about the vertical axis defined by the pipe 33. To this end, a circular drive plate 51 is provided with peripheral teeth and is secured to the pipe 33 above the top of the insulating wall 17. This drive plate 51 is in operative engagement with a worm gear 52 driven by an electric motor M. The motor M, in turn, derives current from a source S when the electric circuit is complete across any pair of a plurality of switches 1 to 16 inclusive and 1a to 16a inclusive. Each of the switches 1 to 16 inclusive is spring biased to an open position and is closed by means of a corresponding push button located on the panel 53 (see Fig. 2) adjacent the doors 22. A plurality of contact buttons 1b to 16b, inclusive, is secured in radiating spiral fashion about the top surface of the circular drive plate 51. Each of these contact buttons is mated to one of the corresponding limit switches 1a to 16a inclusive. Each limit switch, in turn, is spring biased to a closed position and is opened as contact is made with the contact button mated thereto. It will be noted that we have provided sixteen locker spaces 32 in each tier of the turntable. One push button, one limit switch, and one contact button correspond to each of the sixteen vertical rows of lockers.

By way of example, a particular patron's locker may be in the vertical row corresponding to the switches 1 and 1a and to the contact button 1b. If such be the case, the patron will stand in the warm room outside the insulated wall 17 and push the button 1 located on the panel 53. This closes the switch 1 against its spring bias and, since the limit switch 1a is closed whenever the turntable is not aligned to the position corresponding thereto, current is supplied to the motor M from the source S across the switches 1 and 1a. Thereafter, the motor M turns the worm gear 52 to rotate the circular drive plate 51 and the turntable. At such time as the vertical row of lockers corresponding to the position 1 swings to a position directly behind the doors 22, the contact button 1b opens the limit switch 1a to break the circuit to the motor M. The patron may then open the door 22 which corresponds to the tier in which his locker lies and easy access is provided by means of the T-shaped door 42.

To understand the operation of our invention, particular reference should be made to Fig. 2. This figure indicates the manner in which our contiguous cylindrical storage room 18 and sharp freeze room 20 are separated only by the insulated wall 21, yet these rooms are in communication through the air ducts 28 and 29. Within the sharp freeze room 20, we have provided the refrigerated surface 24 and the blower 25 for refrigerating and circulating air up through the sharp freeze room, out into the storage room, through the lockers and the various passages, and back to the sharp freeze room. Thus, we utilize the principle of convection to effect a heat transfer. That is to say, we refrigerate or chill the air, with the surface 24, and thereafter transmit or convey this air through the storage and sharp freeze rooms, sequentially. Generically, this process is one of convection in that the air transports or conveys the cold through the rooms. This convection is enhanced by the novel duct, passage, and circulation space structure heretofore described. By way of example, one circulation cycle carries the refrigerated air up through the sharp freeze room 20, into the cylindrical storage room 18 via the upper duct 29, horizontally across the storage room via the top circulation space 29, down through both the segmental vertical passages 47 and the central vertical passages 46, radially inward through each individual locker, horizontally back to the duct 28 through the bottom circulation space 48, and so forth. This typical cycle demonstrates the manner in which we provide differential temperatures between our sharp freeze room and storage room. Thus, as the refrigerated air moves upward through the sharp freeze room, it picks up heat as the products on the shelves 27 are chilled. In practice, we have found that the heat thus imparted to the air mass may raise the temperature thereof 5 to 25 degrees. This is exactly the result desired since the sharp freeze room should be kept at a temperature between 15 and 25 degrees lower than the storage room. Such a sequential refrigeration by convection is an important function of our invention and we deem the structure bottoming this function to be of critical importance.

It will now be seen that we have served the objects of our invention by providing a prefabricated frozen food locker which is cylindrical in shape to accommodate a rotatably mounted locker assembly. This structure, together with the novel sharp freeze room and unitary refrigeration structure, allows our entire unit to be assembled at a minimum cost and in a minimum of time, yet the resultant structure will occupy a minimum space. Furthermore, our novel circulation space and vertical passage arrangement within the storage room promote efficient refrigeration by convection, yet do not add to the overall space requirement. In summation, it is these novel cooperative structures which adapt our rotary locker efficiently to the needs of country stores, apartment houses, small groceries, and small communities or housing projects. Each such structural feature cooperates with every other structural feature toward the attainment of the twin advantages of low fabrication cost and minimum floor space.

We claim:

1. A convection refrigeration locker, comprising a cylindrical storage room bounded by a closed insulating wall, a sharp freeze room bounded by an extension of said wall and communicating with said storage room via a plurality of circulation ducts, a plurality of interconnected solid radial walls and solid horizontal spacers defining a plurality of wedge-shaped lockers mounted for rotation within said storage room, a majority of said spacers having raised margins to define a cupped bottom for each locker corresponding thereto, and means within said sharp freeze room for refrigerating said lockers.

2. A refrigerator, comprising a contiguous sharp freeze room and cylindrical storage room bounded by a closed insulating wall and separated by one section thereof, a plurality of interconnected solid radial walls and solid horizontal spacers defining a plurality of wedge-shaped lockers mounted for rotation within said storage room, a majority of said spacers having raised margins to define a cupped bottom for each locker corresponding thereto, a majority of said lockers being substantially open at both ends and removably carrying three apertured baskets to thereby promote radial convection, and means within said sharp freeze room for refrigerating and circulating air therethrough and through said lockers, respectively.

3. A refrigerator, comprising a closed insulating wall bounding a storage room having no refrigeration mechanism therein, a radial extension to said wall bounding a sharp freeze room having refrigeration mechanism therein, said rooms being interconnected by a circulation duct, a turntable mounted for rotation within said storage room but spaced from the bottom and top walls thereof to provide a bottom and a top circulation space communicating with said circulation duct, said turntable being subdividing into a plurality of wedge-shaped lockers, said sharp freeze room refrigeration mechanism including means for refrigerating and blowing cold air through said circulation duct and spaces from said sharp freeze room to the storage room sequentially.

4. A refrigerator, comprising a closed insulating wall bounding a storage room having no refrigeration mechanism therein, a radial extension to said wall bounding a sharp freeze room having refrigeration mechanism therein, said rooms being interconnected by a lower and an upper circulation duct, a turntable mounted for rotation within said storage room but spaced from the bottom and top walls thereof to provide a bottom and a top circulation space communicating with said lower and upper circulation ducts respectively, said sharp freeze room refrigeration mechanism including means for refrigerating and blowing air through said sharp freeze room and storage room sequentially, and means operable from without said storage room for rotating said turntable.

5. A refrigerator, comprising a closed cylindrical insulating wall bounding a cylindrical storage room, a radial extension to said wall bounding a sharp freeze room, said rooms being interconnected by a circulation duct, a turntable mounted for rotation within said storage room but spaced from the bottom and top walls thereof to provide a bottom and a top circulation space communicating with said circulation duct, said turntable being subdividing into a plurality of wedge-shaped lockers arranged in vertical rows and horizontal tiers, a majority of said lockers being substantially open at both ends to promote radial passage of air therethrough, the peripheral outline of each said tier being polygonal to define with said cylindrical wall a plurality of segmental vertical passages, and means within said sharp freeze room for refrigerating and blowing air through said sharp freeze room and storage room sequentially.

6. A refrigerator, comprising a closed insulating wall bounding a storage room, a radial extension to said wall bounding a sharp freeze room, said rooms being interconnected by a lower and an upper circulation duct, a turntable mounted for rotation within said storage room but spaced from the bottom and top walls thereof to provide a bottom and a top circulation space communicating with said lower and upper circulation ducts respectively, said turntable being subdividing into a plurality of wedge-shaped lockers, each said horizontal spacer terminating short of said vertical axis to define a plurality of vertical passages, and means within said sharp freeze room for refrigerating and blowing air through said sharp freeze room and storage room, sequentially, said means including a refrigerated surface and a blower for circulating air over said surface and through said circulation ducts, circulation spaces, and vertical passages.

7. A convection refrigeration locker, comprising a closed cylindrical insulating wall bounding a cylindrical storage room lacking a refrigeration mechanism, a radial extension to said wall bounding a sharp freeze room having a refrigeration mechanism, said rooms being interconnected by a circulation duct, said wall extension having a door and said sharp freeze room having a plurality of shelves accessible through the door, a turntable mounted for rotation about a vertical axis within said storage room but spaced from the bottom and top walls thereof to provide a bottom and a top circulation space communicating with said lower and upper circulation ducts respectively, said turntable including a plurality of interconnected radial walls and horizontal spacers subdividing the same into a plurality of wedge-shaped lockers arranged in vertical rows and horizontal tiers about said vertical axis, the peripheral outline of each said tier being polygonal to define with said cylindrical wall a plurality of segmental vertical passages, each said horizontal spacer terminating short of said vertical axis to define a second plurality of vertical passages, said sharp freeze room refrigeration mechanism including means for refrigerating air and blowing it through said sharp freeze room and storage room, sequentially.

VIRGIL P. LONG.
VERLIN M. WOLFE.

REFERENCES CITED

The following references are of record in the file of this patent:

UNITED STATES PATENTS

| Number | Name | Date |
|---|---|---|
| 938,620 | Tilghman | Nov. 2, 1909 |
| 2,201,411 | Smith | May 21, 1940 |
| 2,259,803 | Cumming | Oct. 21, 1941 |
| 2,484,894 | Lindsay | Oct. 18, 1949 |
| 2,546,363 | Jaeger | May 27, 1951 |